United States Patent
Lin (10) Patent No.: US 9,809,066 B2
(45) Date of Patent: Nov. 7, 2017

(54) SYSTEM FOR AN AIR MAINTENANCE TIRE ASSEMBLY

(71) Applicant: The Goodyear Tire & Rubber Company, Akron, OH (US)

(72) Inventor: Cheng-Hsiung Lin, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 409 days.

(21) Appl. No.: 14/269,294

(22) Filed: May 5, 2014

(65) Prior Publication Data

US 2015/0314657 A1 Nov. 5, 2015

(51) Int. Cl.
 *B60C 23/12* (2006.01)
(52) U.S. Cl.
 CPC .................................... *B60C 23/12* (2013.01)
(58) Field of Classification Search
 CPC ...................................................... B60C 23/12
 See application file for complete search history.

(56) References Cited

U.S. PATENT DOCUMENTS

| | | | |
|---|---|---|---|
| 3,931,843 A | 1/1976 | Edwards et al. | |
| 3,967,670 A | 7/1976 | Brickwood | |
| 4,149,579 A | 4/1979 | Senger | |
| 4,349,064 A | 9/1982 | Booth | |
| 4,570,691 A | 2/1986 | Martus | |
| 4,651,792 A | 3/1987 | Taylor | |
| 5,180,455 A | 1/1993 | Cheng | |
| 5,201,968 A | 4/1993 | Renier | |
| 5,355,924 A | 10/1994 | Olney | |
| 5,409,049 A * | 4/1995 | Renier | B60C 23/12 152/418 |
| 5,472,032 A * | 12/1995 | Winston | B60C 23/004 152/415 |
| 5,556,489 A | 9/1996 | Curlett et al. | |
| 5,558,730 A * | 9/1996 | Olney | B60C 23/004 152/418 |
| 5,707,215 A | 1/1998 | Olney et al. | |
| 6,474,383 B1 | 11/2002 | Howald et al. | |
| 6,691,754 B1 | 2/2004 | Moore | |

(Continued)

FOREIGN PATENT DOCUMENTS

| | | |
|---|---|---|
| CN | 1393353 A | 1/2003 |
| CN | 1769082 A | 5/2006 |

(Continued)

OTHER PUBLICATIONS

European Search Report for Application Serial No. EP15166294 dated Aug. 25, 2015.

(Continued)

*Primary Examiner* — Kip T Kotter
(74) *Attorney, Agent, or Firm* — Robert N. Lipcsik (57) ABSTRACT

A system is used with a pneumatic tire mounted on a wheel rim to keep the pneumatic tire from becoming underinflated. The first system includes a plurality of pumps attached circumferentially to the wheel rim, each pump having pump parameters, and a control valve for controlling inlet air into a tire cavity of the pneumatic tire. The control valve has valve parameters. The system predicts system performance under various configurations and conditions through use of the pump parameters and the valve parameters.

13 Claims, 8 Drawing Sheets

(56) References Cited

U.S. PATENT DOCUMENTS

| | | |
|---|---|---|
| 6,725,895 B1 | 4/2004 | Tsipov |
| 6,744,356 B2 | 6/2004 | Hamilton et al. |
| 6,880,598 B2 | 4/2005 | Haunhorst et al. |
| 7,051,778 B2 | 5/2006 | Mancosu et al. |
| 7,117,910 B2 | 10/2006 | Akahori |
| 7,237,590 B2 | 7/2007 | Loewe |
| 7,284,585 B2 * | 10/2007 | Ogawa ................ B60C 23/0408 152/415 |
| 7,322,392 B2 | 1/2008 | Hawes |
| 7,357,164 B2 | 4/2008 | Loewe |
| 7,748,422 B2 | 7/2010 | Bol |
| 7,784,513 B2 | 8/2010 | Loewe |
| 7,891,393 B1 | 2/2011 | Czarno |
| 7,911,332 B2 | 3/2011 | Caretta et al. |
| 7,926,521 B2 | 4/2011 | Izumoto et al. |
| 8,113,254 B2 | 2/2012 | Benedict |
| 8,186,402 B2 | 5/2012 | Eigenbrode |
| 8,327,897 B2 | 12/2012 | Firestone |
| 8,474,500 B2 | 7/2013 | Caretta et al. |
| 8,534,335 B2 | 9/2013 | Benedict |
| 8,807,182 B2 | 8/2014 | Kelly |
| 8,960,249 B2 | 2/2015 | Lin |
| 9,114,674 B2 | 8/2015 | Hall |
| 9,151,288 B2 | 10/2015 | Richardson et al. |
| 9,222,473 B2 | 12/2015 | Richardson |
| 9,409,454 B2 | 8/2016 | Middelberg |
| 9,505,278 B1 | 11/2016 | Gau et al. |
| 2009/0044891 A1 | 2/2009 | Young |
| 2010/0078109 A1 | 4/2010 | Wilson et al. |
| 2010/0282388 A1 | 11/2010 | Kelly |
| 2013/0032263 A1 | 2/2013 | Bormann |
| 2013/0251553 A1* | 9/2013 | Richardson ............. F04C 25/00 417/321 |
| 2014/0023518 A1 | 1/2014 | O'Brien et al. |
| 2014/0366957 A1 | 12/2014 | Wang et al. |
| 2015/0147198 A1 | 5/2015 | Chawla et al. |
| 2015/0147199 A1 | 5/2015 | Chawla et al. |
| 2015/0314657 A1 | 11/2015 | Lin |
| 2017/0015146 A1 | 1/2017 | Serret et al. |

FOREIGN PATENT DOCUMENTS

| | | |
|---|---|---|
| CN | 101367321 A1 | 2/2009 |
| DE | 2813601 A1 | 10/1979 |
| EP | 0855294 A3 | 12/1999 |
| WO | WO0128787 A1 | 4/2001 |

OTHER PUBLICATIONS

Johnson Controls, Inc., Valve and Actuator Manual, Valve Basics and Sizing Information Section, Engineering Data Book Vb1, issue Date 1994.

Chinese Search Report dated Jul. 25, 2016 for Application Serial No. 201510222807.4.

* cited by examiner

SYSTEM FOR AN AIR MAINTENANCE TIRE ASSEMBLY

FIELD OF THE INVENTION

The present invention relates to a system and method for maintaining appropriate air pressure within a pneumatic tire. More specifically, the present invention relates to a rim mounted system for directing air into a tire cavity of a pneumatic tire.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires are often continually underinflated. Accordingly, drivers must repeatedly act to maintain tire pressures or fuel economy, tire life, and/or vehicle braking and handling performance will be reduced. Tire Pressure Monitoring Systems (TPMS) have been proposed to warn drivers when tire pressure is significantly low. Such systems, however, remain dependent upon a driver taking remedial action, when warned, to re-inflate a tire to the recommended pressure. It is desirable, therefore, to incorporate an air maintenance feature within a pneumatic tire that will maintain recommended air pressure without requiring bothersome driver intervention.

SUMMARY OF THE INVENTION

A first system in accordance with the present invention is used with a pneumatic tire mounted on a wheel rim to keep the pneumatic tire from becoming underinflated. The first system includes a plurality of pumps attached circumferentially to the wheel rim, each pump having pump parameters, and a control valve for controlling inlet air into a tire cavity of the pneumatic tire. The control valve has valve parameters. The system predicts system performance under various configurations and conditions through use of the pump parameters and the valve parameters.

According to another aspect of the first system, the plurality of pumps and the control valve define a multi-chamber pump configuration.

According to still another aspect of the first system, each pump includes one piston placed between two chambers.

According to yet another aspect of the first system, the two chambers are connected by a narrow passage having a one-way check valve.

According to still another aspect of the first system, the plurality of pumps define a force control system with a maximum pumping capability determined by a piston of each pump moving a maximum distance within each pump.

According to yet another aspect of the first system, each pump includes a first diaphragm limiting motion of a piston in a first direction and a second diaphragm limiting motion of the piston in a second opposite direction.

According to still another aspect of the first system, the system is driven by two force a gravitation component and an acceleration component.

According to yet another aspect of the first system, the pump parameters include a piston mass parameter, a first piston travel parameter, and a second piston travel parameter.

A second system in accordance with the present invention models a pneumatic tire mounted on a wheel rim and a pumping mechanism mounted on the wheel rim to keep the pneumatic tire from becoming underinflated. The second system includes a plurality of pumps attached circumferentially to the wheel rim, each pump having pump parameters, and a control valve for controlling inlet air into a tire cavity of the pneumatic tire. The control valve has valve parameters. The second system predicts system performance under various configurations and conditions through use of the pump parameters and the valve parameters.

According to another aspect of the second system, the plurality of pumps and the control valve define a multi-chamber pump configuration.

According to still another aspect of the second system, each pump includes one piston placed between two chambers.

According to yet another aspect of the second system, the two chambers are connected by a narrow passage having a one-way check valve.

According to still another aspect of the second system, the plurality of pumps define a force control system with a maximum pumping capability determined by a piston of each pump moving a maximum distance within each pump.

According to yet another aspect of the second system, each pump includes a first diaphragm limiting motion of a piston in a first direction and a second diaphragm limiting motion of the piston in a second opposite direction.

According to still another aspect of the second system, the system is driven by two force a gravitation component and an acceleration component.

According to yet another aspect of the second system, the pump parameters include a piston mass parameter, a first piston travel parameter, and a second piston travel parameter.

A pumping mechanism for use with the present invention is used with a pneumatic tire mounted on a wheel rim to keep the pneumatic tire from becoming underinflated. The pumping mechanism includes a plurality of pumps forming a linear belt and subsequently being attached circumferentially to the wheel rim, a plurality of pump holders interconnecting the plurality of pumps in a linear configuration, and a control valve for controlling inlet air into a tire cavity of the pneumatic tire.

According to another aspect of the pumping mechanism, the pumping mechanism provides a low profile and effective multi-chamber pump system mounted inside the wheel rim with no significant modification to the wheel rim and no modification to pneumatic tire.

According to still another aspect of the pumping mechanism, the pumping mechanism utilizes gravitational force changes during rotation of the pneumatic tire.

According to yet another aspect of the pumping mechanism, each pump includes a piston body moving against a pair of diaphragms.

According to still another aspect of the pumping mechanism, the piston body of each pump travel in a first direction and an opposite second direction per each revolution of the pneumatic tire.

According to yet another aspect of the pumping mechanism, load on the pneumatic tire does not affect frequency of pumping action of the pumping mechanism.

According to still another aspect of the pumping mechanism, the plurality of pumps includes 4 to 10 pumps and 4 to 10 pump holders configured circumferentially on a belt forming a loop and fitting circumferentially within a middle groove of the wheel rim.

According to yet another aspect of the pumping mechanism, the control valve is shaped similarly to the pumps such that the control valve is placed in a space between the beginning and the end of the belt.

According to still another aspect of the pumping mechanism, the pump holders have adjustable lengths that multiple sizes of wheel rim.

According to yet another aspect of the pumping mechanism, the pumping mechanism further includes a filter unit connected in series with the pumps and pump holders.

A pneumatic tire for use with the present invention is mounted to a wheel rim to keep the pneumatic tire from becoming underinflated. The pneumatic tire includes a plurality of pumps forming a linear belt and subsequently being attached in series to the wheel rim, a plurality of pump holders interconnecting the plurality of pumps in a linear configuration, and a control valve for controlling inlet air into a tire cavity of the pneumatic tire. The pumps function when mounted in a first circumferential direction on the wheel rim or a second opposite circumferential direction on the wheel rim.

According to another aspect of the pneumatic tire, a plurality of check valves maintain air flow in the pumps in a single direction.

According to still another aspect of the pneumatic tire, a check valve is adjacent each side of the control valve.

According to yet another aspect of the pneumatic tire, the control valve is disposed at an air let to the pumps.

According to still another aspect of the pneumatic tire, the control valve is disposed at an air outlet of the pumps into a tire cavity of the pneumatic tire.

According to yet another aspect of the pneumatic tire, the control valve is disposed in a bypass of the pumps.

According to still another aspect of the pneumatic tire, load on the pneumatic tire does not affect frequency of pumping action of the pumps.

According to yet another aspect of the pneumatic tire, the plurality of pumps includes 4 to 10 pumps and 4 to 10 pump holders configured circumferentially on a belt forming a loop and fitting circumferentially within a middle groove of the wheel rim.

According to still another aspect of the pneumatic tire, the control valve is shaped similarly to the pumps such that the control valve is placed in a space between the beginning and the end of the belt.

According to yet another aspect of the pneumatic tire, the pump holders have adjustable lengths that multiple sizes of wheel rim.

DETAILED DESCRIPTION OF DRAWINGS

The following drawings are illustrative of examples of the present invention.

DETAILED DESCRIPTION OF EXAMPLES OF THE PRESENT INVENTION

As shown in FIGS. 2 through 8, an air maintenance tire system 10 for use with the present invention may provide a low profile and effective multi-chamber pump system that may easily mount inside of a wheel rim 12 with no significant modification to the wheel rim (minor modification may be required for air inlet having two stems). Further, the air maintenance tire 10 requires no significant changes to tire/wheel assembly or tire/wheel performance.

The air maintenance tire 10 may include a pumping mechanism, pump driving mechanism, or pump(s) 14, utilizing gravitational force changes during rotation of the air maintenance tire. The pump driving mechanism(s) 14 may include use of a mass of a piston body 16 moving against a pair of diaphragms 19 or an external mass (not shown) driving the piston body using a cam/gear system. If the mass of the piston body 16 is used, the pump driving mode may be based on force control. If a cam/gear system and external mass are used, gravitational force may drive gear rotation and convert this rotation to controllable displacement, as described in U.S. application Ser. No. 14/091,885, Air Maintenance Tire Assembly, herein incorporated by reference.

As the tire/wheel rotates, the piston body 16 may travel in a forward direction and an opposite backward direction per each revolution thereby producing a high pumping frequency. Thus, higher vehicle speed may provide higher pumping frequency. The parameters of the pumping action depend upon the mass and angular velocity of the tire/wheel assembly. Tire load or other external conditions may not effect pumping action.

Due to an amplification effect, the compression of the pump driving mechanism 14 may be defined as:

$$R=(r)^{2n}$$

where
R: system compression ratio
r: single chamber compression
n: number of pump in the system Thus, a high compression ratio for each pump 18 is not necessary to achieve a high compression ratio (e.g., low force and/or deformation may produce high compression).

The pump driving mechanism 14 may include 4 to 10 pumps 18 and pump holders 20 may be configured linearly on a belt forming a loop and fitting circumferentially in a middle groove of the wheel rim 12 (radially innermost part of the wheel rim). A control valve 22 may be shaped similarly to the pumps 18 and may be placed in a space between the beginning and the end of the belt. Pump holders 20 may have adjustable lengths that fit any size of wheel rim 12.

Figures 4, 5:
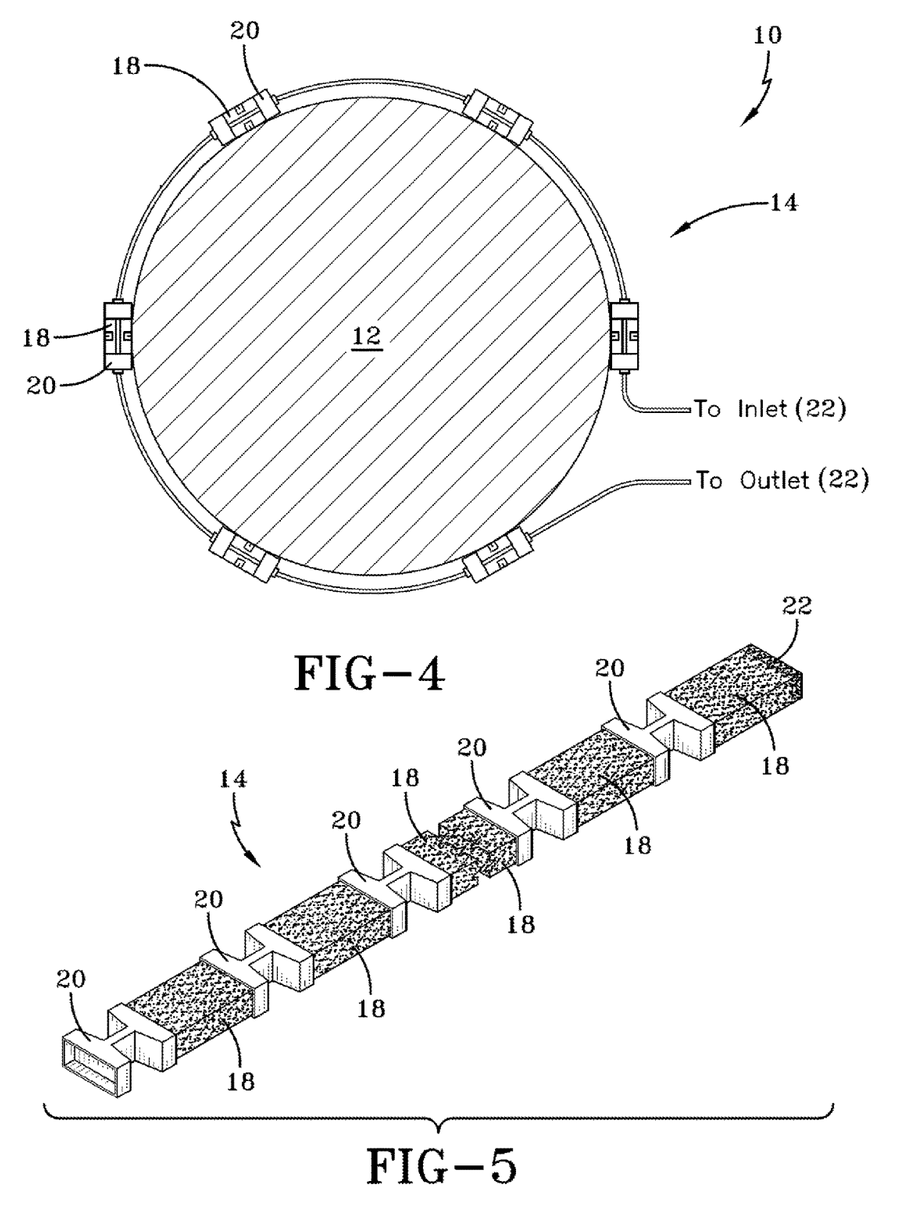
FIG. 4 is a schematic representation of another example system for use with the present invention.
FIG. 5 is a schematic representation of part of the example system of FIG. 4.

A passage connection from a first valve stem to the control valve inlet port may be connected after the belt is secured to wheel rim 12 (FIG. 4). The control valve 22 may include a filter unit 30. The pump driving mechanism 14 may be bi-directional and mounted in either direction. The control valve 22 may include an adjustment for varying a set pressure for the tire cavity. The pump driving mechanism 14 thus may have a low profile around the wheel rim 12 that in no way interferes with tire mount/dismount and provides clearance in the tire cavity for impacts incurred (cleat or pothole) during driving of the vehicle. Further, the 360° design (FIG. 4) of the pump driving mechanism 14 may be a balanced construction in no way degrading the balance of the tire/wheel assembly.

Figure 6:
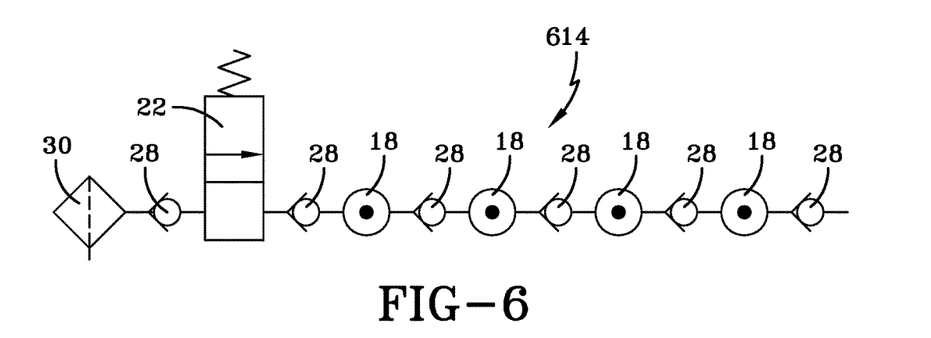
FIG. 6 is a schematic representation of part of still another example system for use with the present invention.

FIG. 6 shows of an example configuration 614 having four pumps 18, six check valves 28, a control valve 22, and a filter 30. This configuration may scale to n pumps 18 with the control valve 22 controlling air inlet into the configuration from outside of the tire 10. The check valve 28 to the left of the control valve 22 in FIG. 6 may be optional.

Figure 7:
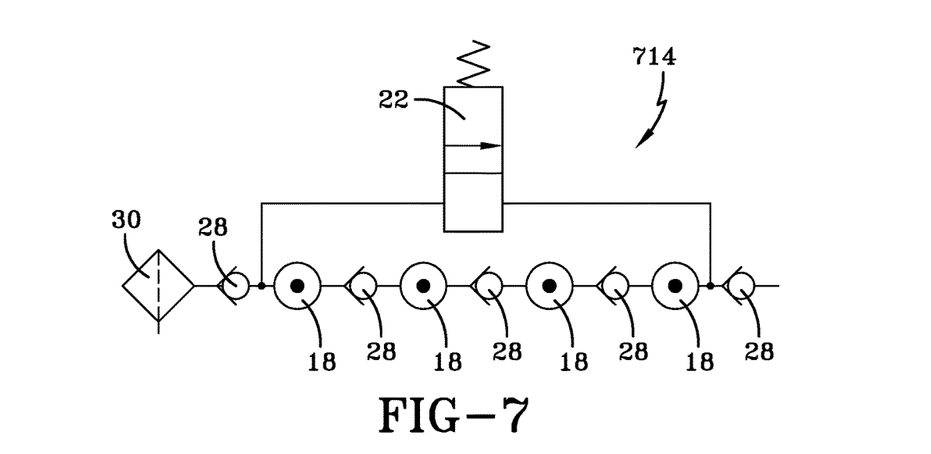
FIG. 7 is a schematic representation of another part of the example system of FIG. 6.

FIG. 7 shows of another example configuration 714 having four pumps 18, five check valves 28, a control valve 22, and a filter 30. This configuration may scale to n pumps 18 with the control valve 22 controlling air outlet from the configuration to the tire cavity. The control valve 22 may be placed in a bypass of the pumps 18.

Figure 8:
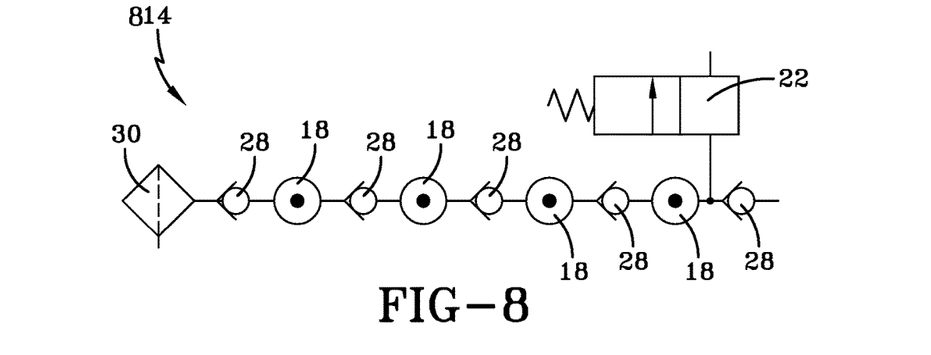
FIG. 8 is a schematic representation of still another part of the example system of FIG. 6.

FIG. 8 shows of still another example configuration 814 having four pumps 18, five six check valves 28, a control valve 22, and a filter 30. This configuration may scale to n pumps 18 with the control valve 22 controlling air outlet from the configuration to the tire cavity. The control valve 22 may be placed in series with the n pumps 18.

A pumping system, theory, or analytical model 100 in accordance with the present invention may define behavior of the multi-chamber pump system described above (FIGS. 2-8). Such a system may be converted to suitable computer codes as an analytical pumping model. This model may design and predict system performance under various configurations and conditions for both consumer and commercial air maintenance tire systems.

There may be n pumps spaced equally about the circumference of the wheel rim 12. Each pump 18 may include one piston 16 placed between two chambers 101, 102, as described above (FIG. 2). One chamber 101 may receive air from an air inlet port 103 and the other chamber 102 may convey air to an air outlet port 104. The two chambers 101, 102 may be connected by a narrow passage having the one-way valve 128, or CV(i), with i=1 to n (FIGS. 4-8). CV(n+1) and CV(n+2) may be placed at the air inlet and outlet of the system 10, and between the pumps 18, CV(i), i=1 to n.

---

Figure 1:
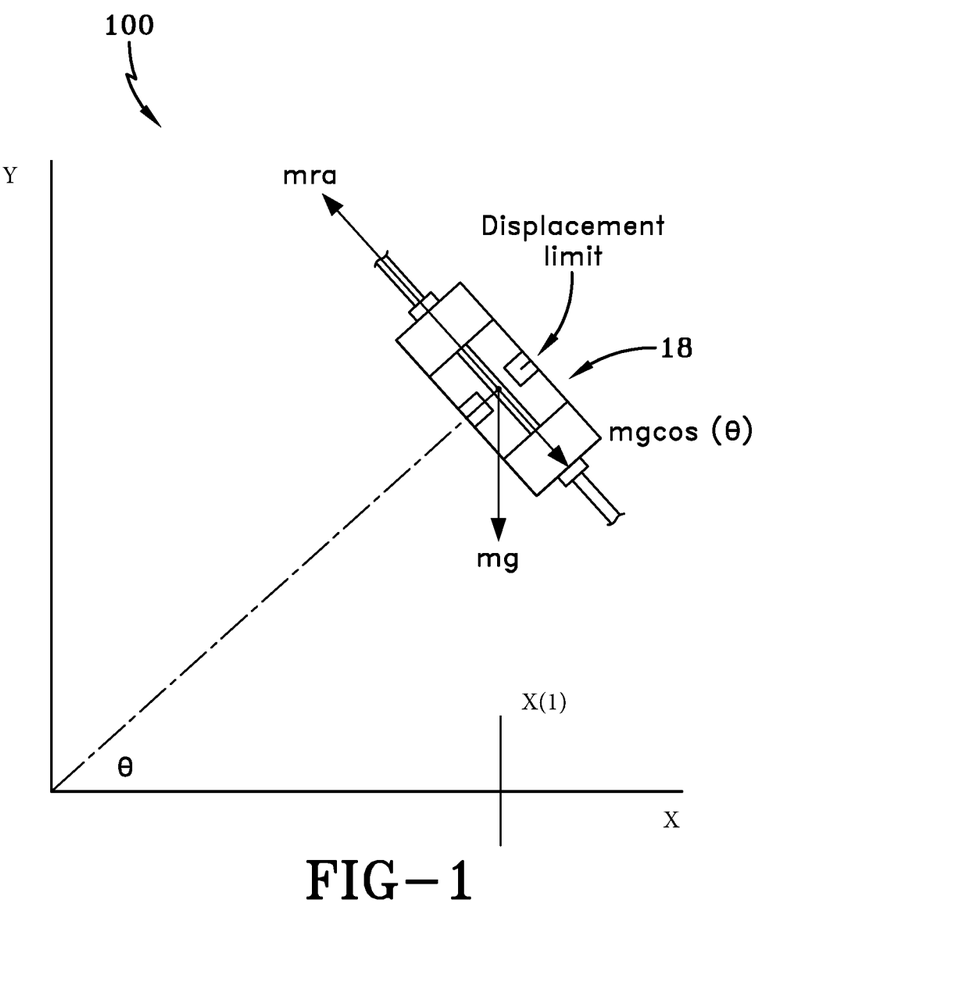
FIG. 1 is a schematic representation of part of a system in accordance with the present invention.
Figure 2:
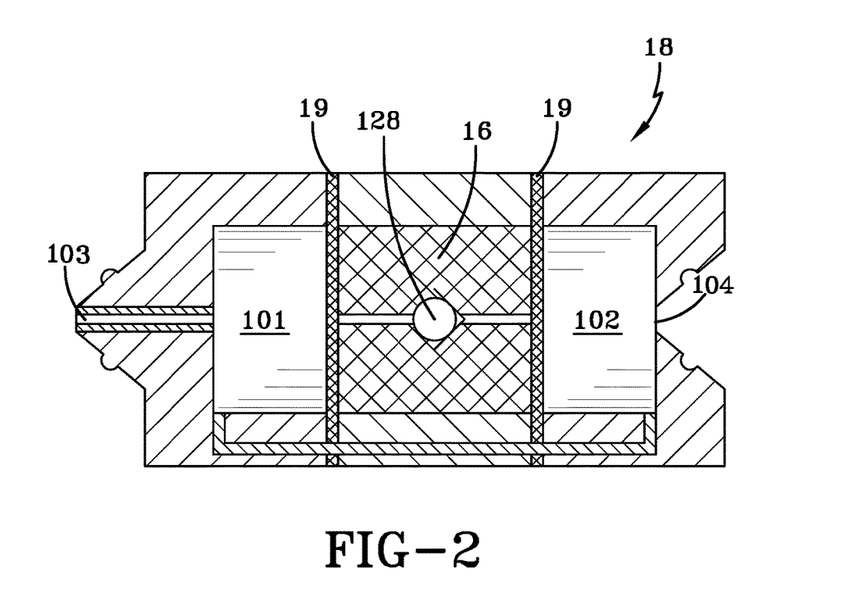
FIG. 2 is a schematic representation of part of a system for use with the present invention.
Figure 3:
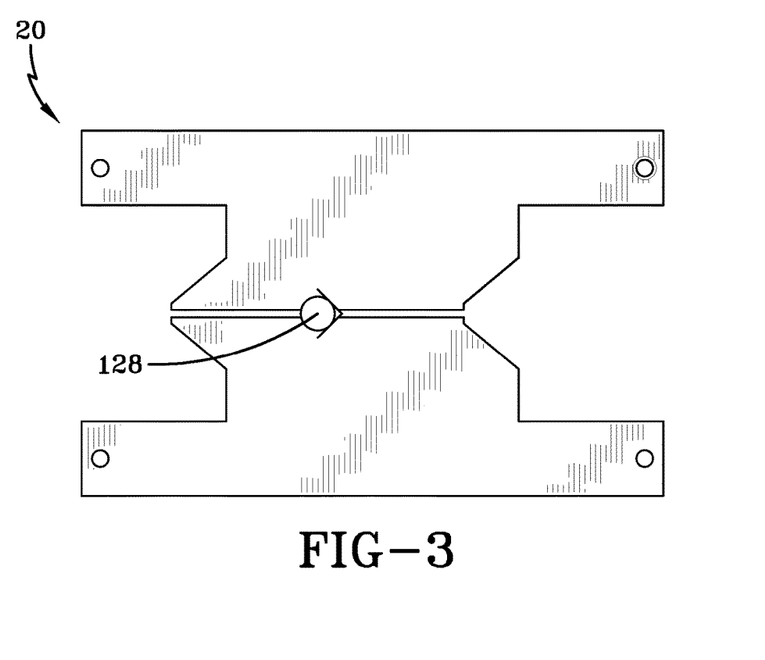
FIG. 3 is a schematic representation of another part of the system of FIG. 2.

For example (FIG. 1):
Step 0
  Flow flat assembly to fit to rim (FIGS. 4 & 5);
  Set $P_R(i)=P_L(i)=P_0$, i=1 to n (total number of pumps 18 used);
  Set x(i)=0 and $\theta(i)=2\pi/n(i-1)$;
  $P_L(0)= P_0$ (always) and $P_R(n+1)=P_{tire}$ (the tire cavity);
  Calculate new x(i), $P_R(i)$ and $P_L(i)$;
  Determine check valve status:
    If $P_R(i) \geq P_L(i)+Pcr$, then icv(i) is open;
    If $P_L(i-1) \geq P_R(i)+Pcr$, then icv(i-1) is open;
    Balance pressure between connected chamber and reset check valve to close; and
    Recalculate x(i), $P_R(i)$ and $P_L(i)$ until no more open check valve.
Step 1 to N
  Rotate wheel to a predefined step angle;
  Calculate new x(i), $P_R(i)$ and $P_L(i)$;
  Determine check valve status:
    If $P_R(i) \geq P_L(i)+Pcr$ then icv(i) is open;
    If $P_L(i-1) \geq P_R(i)+Pcr$ then cv(i-1) is open;
    Balance pressure between connected chamber and reset check valve to close; and
    Recalculate x(i), $P_R(i)$ and $P_L(i)$ until no more open check valve.

---

The system 100 may also be exemplarily described:

---

Pump moved from $\theta$ to $\theta'$
Force components $\Delta PA$ and mg cos ($\theta'$)
where $\Delta P = P_L - P_R$
check force balance for piston movement
If
  $\Delta PA + mg \cos(\theta') - mr\alpha > 0$ then piston moving to right
  $\Delta PA + mg \cos(\theta') - mr\alpha < 0$ then piston moving to left
  $\Delta PA + mg \cos(\theta') - mr\alpha = 0$ then piston no movement
x: current piston position relative to piston center ($-x_o \leq x \leq x_o$)
calculate new position x' by using $\Delta P'A + mg \cos(\theta') - mr\alpha = 0$
where $\Delta P' = P_L' - P_R'$ $$P_L' = P_L \frac{(l+x)A + V_d}{(l+x')A + V_d}$$

$$P_R' = P_R \frac{(l-x)A + V_d}{(l-x')A + V_d}$$

where
l: chamber length at 0 position
$V_d$: dead-end volume (imcompressible) of each chamber
$\alpha$: Angular acceleration (typically around 4 to 7 g)
maintain $-x_o \leq x' \leq x_o$
If $x' > x_o$ then $x' = x_o$
If $x' < -x_o$ then $x' = -x_o$

---

This system 100 (e.g., the air maintenance tire 10 described above) may be a force control system with a maximum pumping capability determined by the piston 16 moving a maximum distance to the right (FIG. 1), as limited by one of the diaphragms 19, X(i)=Xo and $\Delta PA > m(r\alpha - g \cos \theta)$. The maximum pumping pressure may be $n\Delta P = n[m(r\alpha - g \cos \theta)]/A$ psig. For example, a 50 g piston with a 5.0 mm diameter for 6 pumps at a constant speed, ($\alpha$=0), $\Delta P$ may be 21.74 psig. A 50 g piston with a 5.0 mm diameter for 6 pumps at a 5.0 g acceleration, $\Delta P$ may be 130.43 psig. If the resistance, or cracking pressure Pcr, of the check valve 128 is not negligible, the maximum pumping pressure $\Delta P$ may be n($\Delta P$–Pcr). Thus, this system 100 may be driven by two forces components, gravitation G and acceleration A. The gravitation force G may provide a high frequency cyclic effect on the pumps 18 in a short distance. The acceleration force A may provide a low or medium frequency cyclic effect to ensure maximum pumping pressure.

Figure 9A:
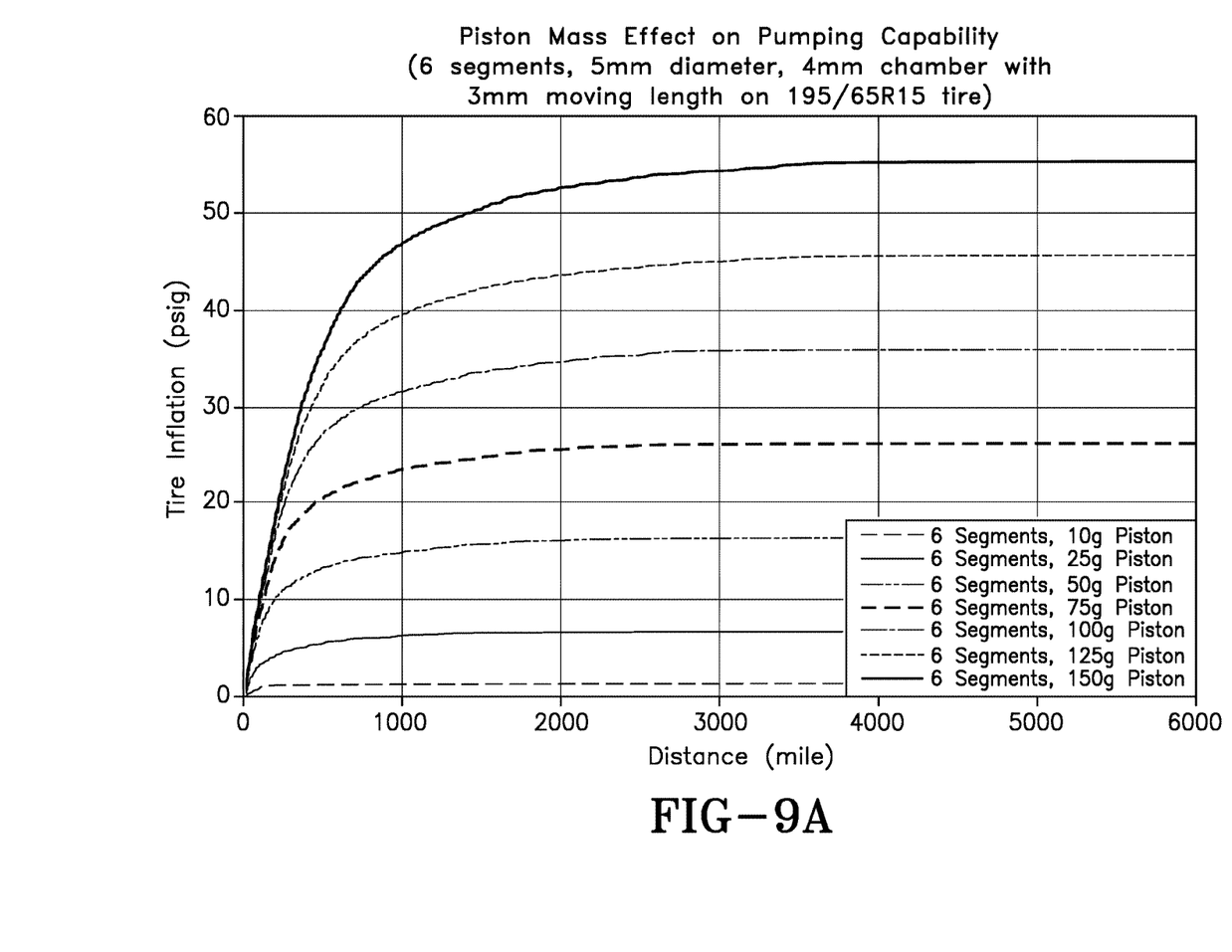
FIGS. 9A & 9B illustrate the piston mass effect on pumping capability and pumping pressure.
Figure 9B:
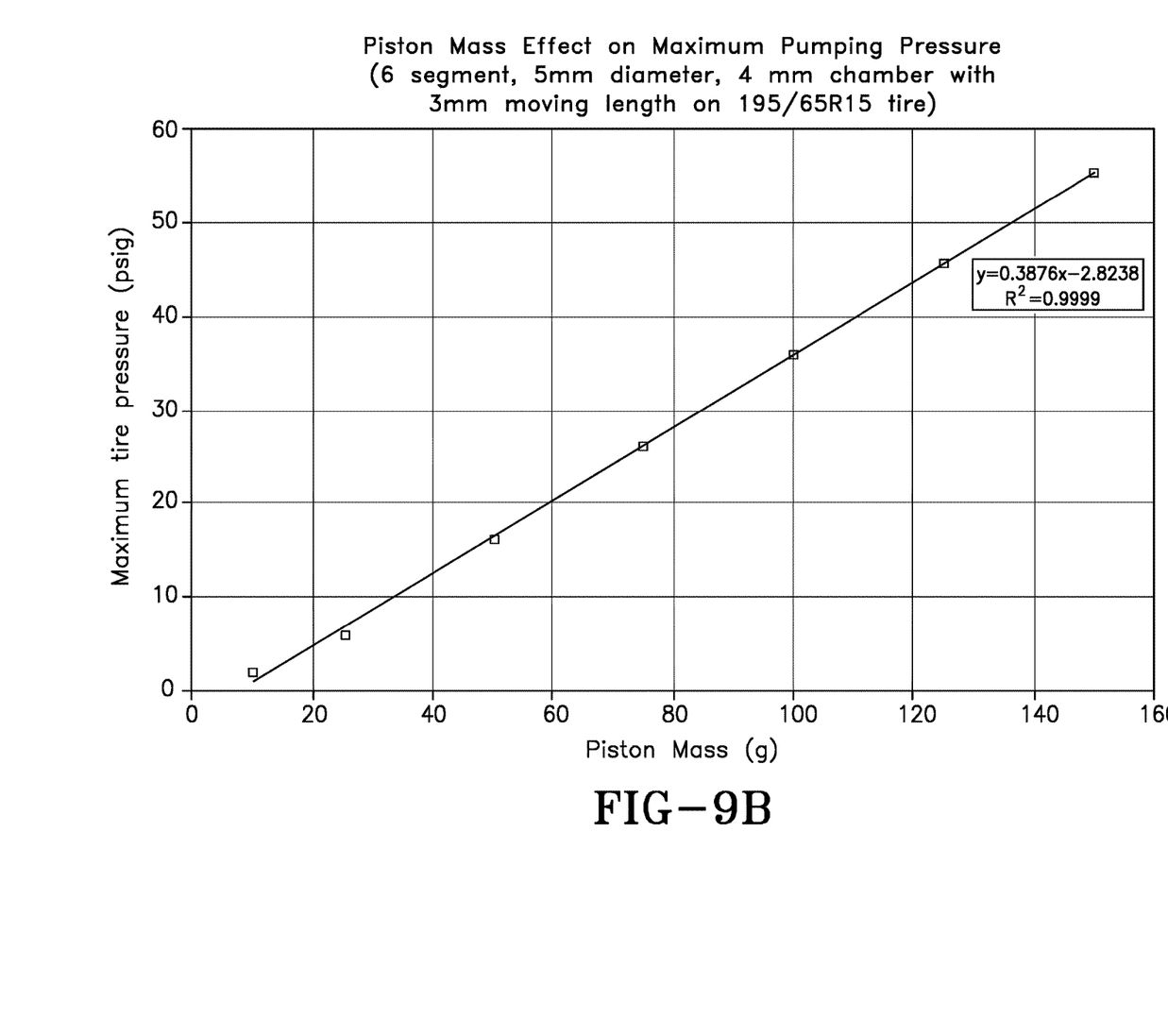
Figure 10A:
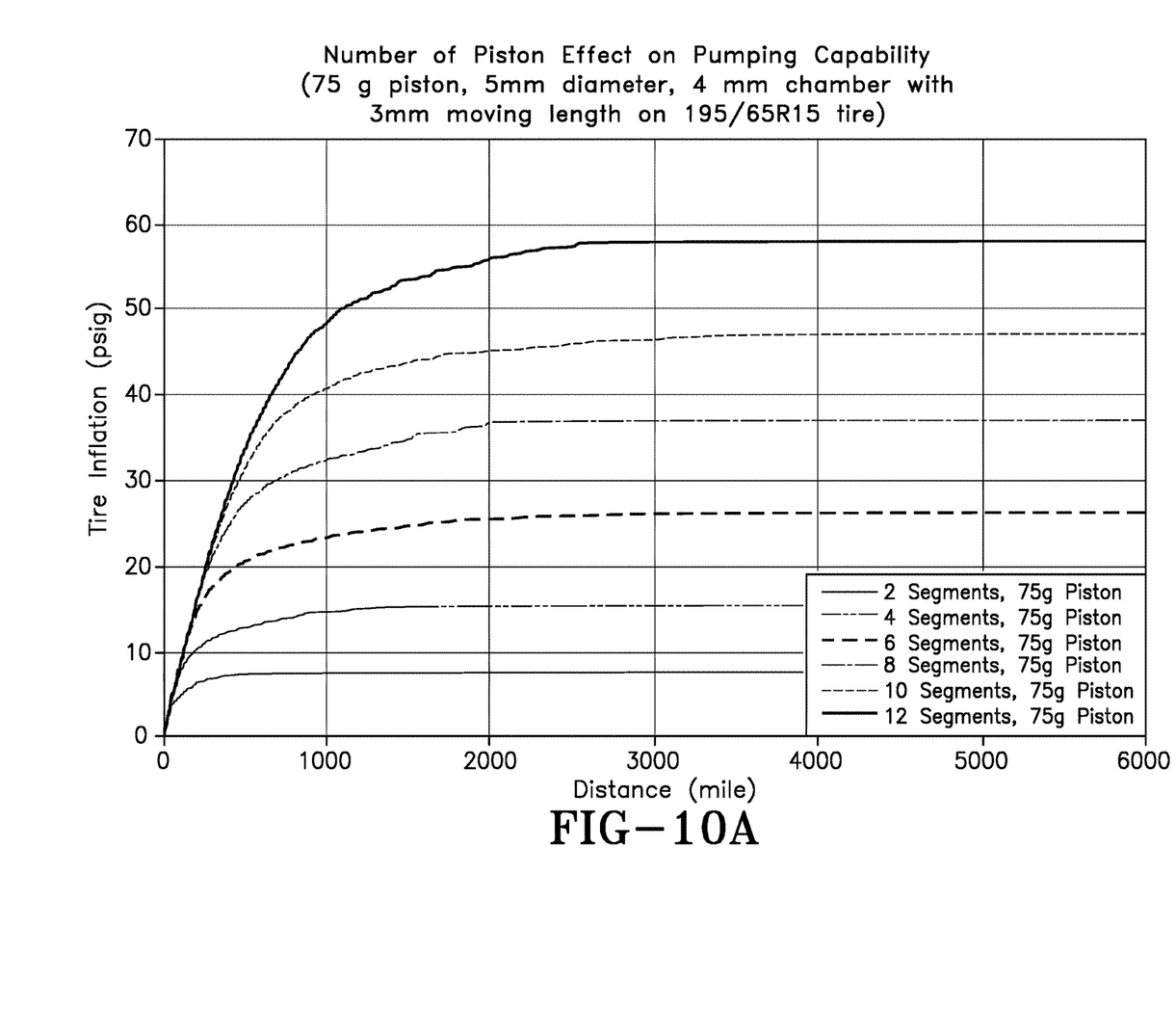
FIGS. 10A & 10B illustrate the number of pistons effect on pumping capability and pumping pressure.
Figure 10B:
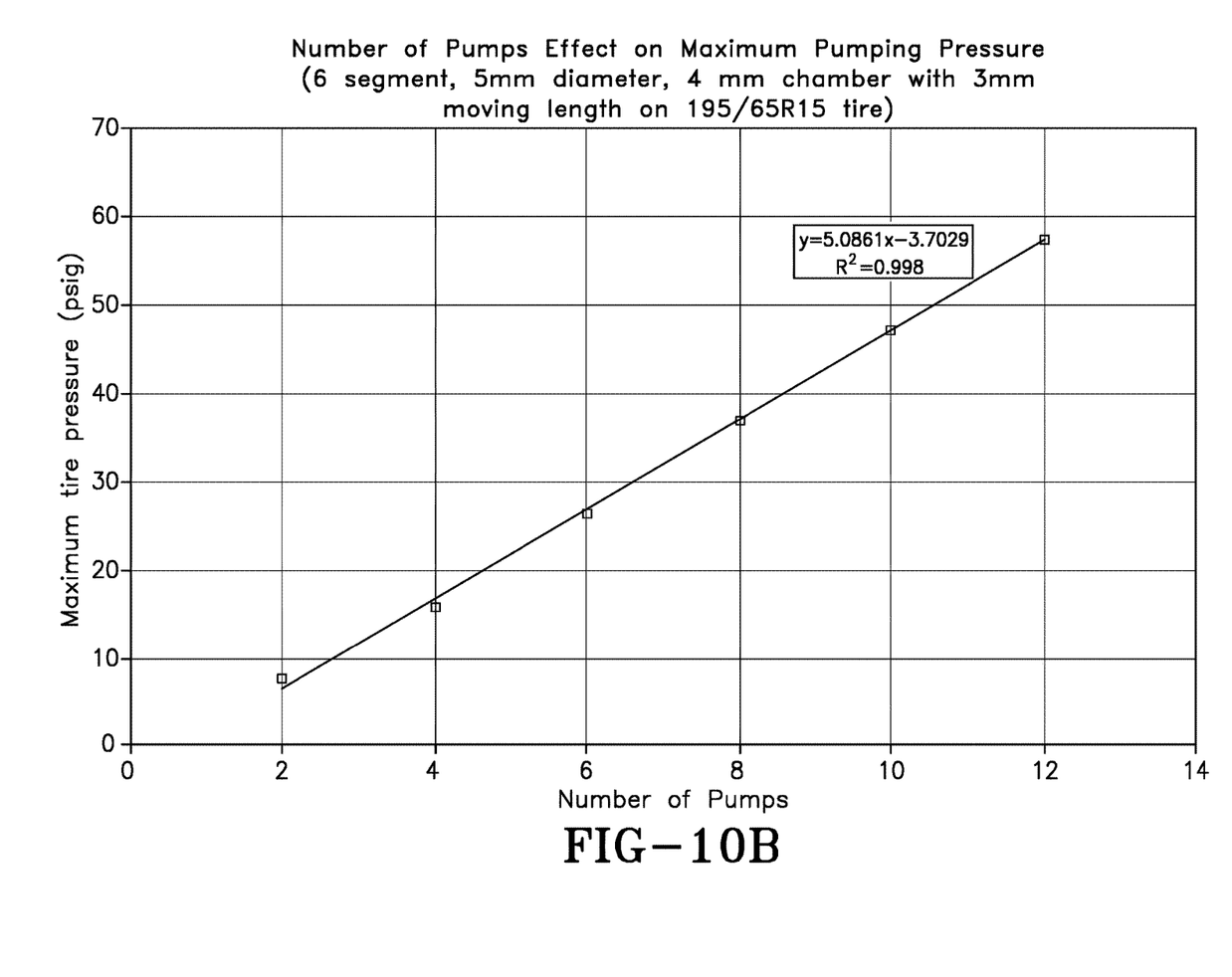

Under a first example condition, a piston mass effect under constant speed, 6 pumps with 5.0 mm piston diameters, 4.0 mm length chambers (e.g., 101, 102), and 3.0 mm maximum travel may be mounted on a 15" wheel/tire (FIGS. 9A & 9B). Under a second example condition, a number of piston effect under constant speed, 75.0 g pistons with 5.0 mm diameters, 4.0 mm length chambers (e.g., 101, 102), and 3.0 mm maximum travel may be mounted on a 15" wheel/tire (FIGS. 10A & 10B).

While certain representative examples and details have been shown for the purpose of illustrating the present invention, it will be apparent to those skilled in this art that various changes and modifications may be made therein without departing from the spirit or scope of the present invention.

What is claimed:

1. A pumping assembly for use with a pneumatic tire mounted on a tire rim to keep the pneumatic tire from becoming underinflated, the pumping assembly comprising:
    a first pump having a first chamber and a second chamber, an outlet of the second chamber being connected to an inlet of a second pump, the first pump including a piston placed between the first chamber and the second chamber; and
    a check valve being disposed between the second chamber of the first pump and the inlet of the second pump.

2. The pumping assembly as set forth in claim 1 wherein an outlet of the pumping assembly is in fluid communication with a tire cavity of the pneumatic tire.

3. The pumping assembly as set forth in claim 1 wherein the pumping assembly is mounted on the tire rim.

4. The pumping assembly as set forth in claim 1 further including an inlet control valve for controlling air flow into the pumping assembly.

5. The pumping assembly as set forth in claim 1 wherein an outlet pressure of the first pump becomes an inlet pressure of the second pump so that the pumping assembly produces an amplification effect.

6. The pumping assembly as set forth in claim 5 wherein the check valve is located between the outlet of the second chamber and the inlet of the second pump.

7. The pumping assembly as set forth in claim 1 wherein the second pump has a first chamber and a second chamber.

8. The pumping assembly as set forth in claim 7 wherein another check valve is positioned between the first chamber of the second pump and the second chamber of the second pump.

9. The pumping assembly as set forth in claim 1 wherein the first pump includes another check valve mounted therein.

10. The pumping assembly as set forth in claim 1 wherein the first chamber of the first pump and the second chamber of the first pump are connected by a narrow passage having another check valve disposed therein.

11. The pumping assembly as set forth in claim 1 wherein the first pump includes a first diaphragm limiting motion of the piston in a first direction and a second diaphragm limiting motion of the piston in a second opposite direction.

12. The pumping assembly as set forth in claim 1 further including an outlet control valve.

13. A pumping assembly for use with a pneumatic tire mounted on a tire rim to keep the pneumatic tire from becoming underinflated, the pumping assembly comprising:
    a first pump having a first chamber and a second chamber, an outlet of the second chamber being connected to an inlet of a second pump, the first pump including a first diaphragm limiting motion of a piston in a first direction and a second diaphragm limiting motion of the piston in a second opposite direction; and
    a check valve being disposed between the second chamber of the first pump and the inlet of the second pump.

* * * * *